Patented Nov. 14, 1950

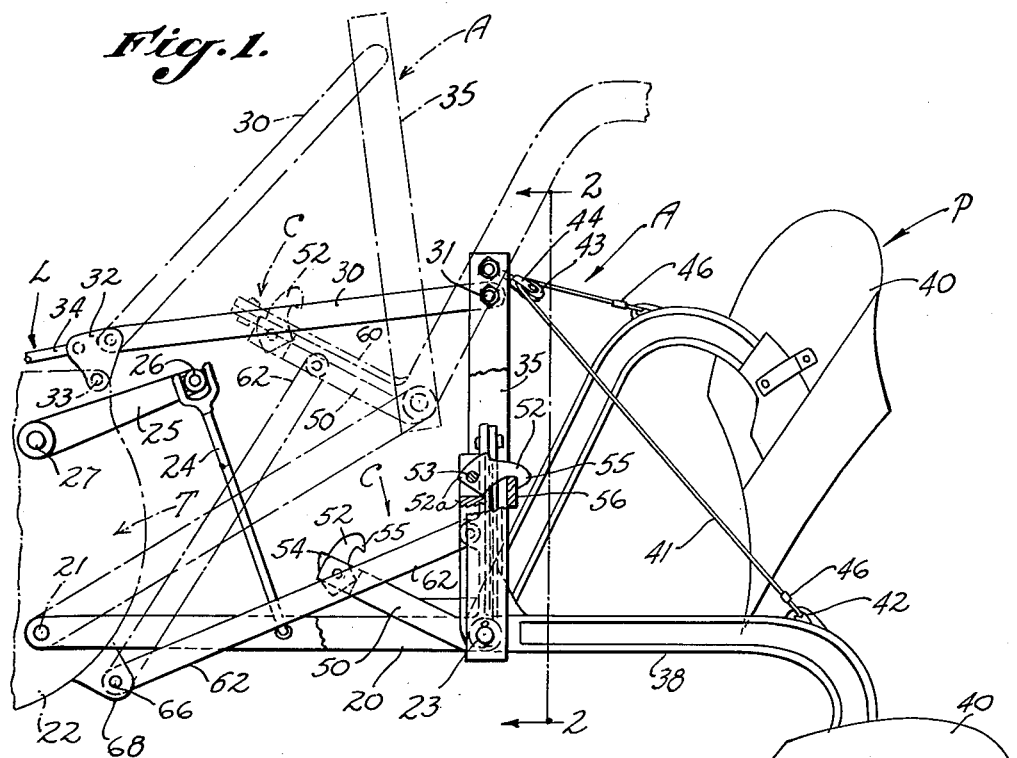

2,529,809

UNITED STATES PATENT OFFICE 2,529,809

AUTOMATIC POWER LIFT TRIP FOR TWO-WAY PLOWS

William Fisk Mellen, Whittier, Calif., assignor to Alice Marian Mellen, Whittier, Calif.

Application November 24, 1947, Serial No. 787,724

16 Claims. (Cl. 97—29)

This invention relates to plowing structures and particularly to those frequently known as two-way plows wherein oppositely pitched plow bottoms are employed which may be alternately raised and lowered so that a plow may be run in opposite directions while throwing furrows always toward the same side of the field.

One object of the present improvement is to provide novel means for producing automatic shift of the plow bottoms through the medium of power lift means now commonly provided on tractors for lifting and lowering, as required, plows and other earthworking implements drawn by such tractors.

An incidental object of the invention is to provide a shift of the indicated nature such that the only operations required to be instituted by the tractor driver are those commonly required to cause raising of the earthworking unit as a whole from the soil and lowering thereof to work the soil, the shifting of the plow bottoms with respect to each other being fully automatic and requiring no special attention from the driver.

Another object is to provide such a device which is simple and relatively inexpensive while being at the same time very efficient and durable.

Other objects and the various features of the invention will become apparent to those skilled in the art upon reference to the following specification and the accompanying drawing, wherein various embodiments of the invention are shown by way of illustration.

In the drawing:

Fig. 1 is a side elevation illustrating the mounting of the invention upon the rear portion of a housing of a conventional tractor, one plow bottom being shown in lowered operative position and the other plow bottom being shown in an elevated inoperative position;

Fig. 2 is principally a rear end elevation as indicated by the line 2—2 of Fig. 1, some of the parts being shown in cross section;

Fig. 3 is a fragmentary perspective view illustrating the functioning of the cam shifting means; and Fig. 4 is a fragmentary elevational view taken approximately from the line 4—4 of Fig. 2 and showing an intermediate position of a control linkage employed.

The construction illustrated in the drawing comprises principally a frame A commonly known in this art as an A-frame, a plow unit in the form of two counterbalanced oppositely pitched plow bottoms generally designated at P, an actuating and control linkage generally indicated at C, and a power lift mechanism generally indicated at L and carried by the rearward end of a tractor generally represented at T.

The frame A is supported at its lower end by a pair of spaced lifting arms 20 whose forward ends are pivotally attached by appropriate pivots 21 to the lower side portions of a rear housing 22 constituting a portion of the body of the tractor T. The opposite or rearward ends of the lifting arms 20 receive the ends of a shaft 23, these ends laterally projecting from the lower enf of the A-frame, and the assembly being maintained by means of cotter keys or otherwise as may be required. The lifting arms 20 are controlled by elevator pull rods 24 actuated by crank arms 25 through the medium of universal joints 26, said arms 25 being affixed to and actuated by a bell crankshaft 27 which projects through the tractor housing 22 and is in turn operated by any conventional hydraulic mechanism (not shown) contained within the housing 22. The crank arms 25, the shafts 27 to whose opposite ends the arms 25 are attached, and the hydraulic apparatus within the housing 22 comprise the power lift L which is a well known construction forming no part of this invention and, therefore, will not be further described. The upper end of the frame A is maintained in a required vertical position through the medium of a positioning bar 30 connected to an upper portion of the frame A as by a bolt 31 and to the tractor T by means of a triangular plate 32 whose lower corner is mounted by pivots 33 upon the housing 22, the rearward upward corner of the plate 32 having a pivotal connection with the forward end of the positioning bar 30 and the other upper corner of the plate 32 having a pivotal connection with a power lift control rod 34 which extends forward into an upper continuation of the housing 22 (not shown) where it serves to regulate hydraulic power fluid to the power lift L in a well known manner.

The frame A comprises two spaced vertically disposed bent side members 35 whose lower extremities receive the ends of the shaft 23 by which the frame A is supported upon the lifting arms 20. Between the lower extremities of the side members 35 of the A-frame, the shaft 23 carries spacing sleeves 36 and also pivotally carries on its middle portion the forward ends of two spaced plow beams 38 provided with bearing eyes 38a (Fig. 3) through which the shaft 23 passes. The rearward portions of the beams 38 are down turned as illustrated and have secured thereto conventional plow bottoms 40 which are respectively pitched in opposite directions so that, when the plow structure is being drawn in a given direction, one plow bottom 40 will turn a furrow to one side and the other plow bottom will turn a furrow to the other side, according to which plow is raised and which plow is lowered. Also the plow bottoms are arranged so that both may be placed in lowered position at the same time, whereby a ditch may be formed.

For the purpose of simultaneously lowering one plow bottom while the other is being raised, the two plow bottoms 40 are interconnected by a flexible cable 41 whose ends are appropriately engaged in eyes 42 provided on rearward portions of the plow beams 38 and whose middle portion passes through a pulley 43 carried by a suitable mounting 44 secured between upper extensions 35a of the side members 35 as by the medium of a cross bolt 45 lying above the bolt 31 which positions the rearward end of the positioning bar 30. By detaching the bolt 45, both of the plow bottoms 40 may be lowered into the ditching position mentioned. For the purpose of adjusting the length of the cable 41 as may be required, at least one end of the cable is provided with removable or adjustable clamp means 46.

Each of the plow beams 38 has at its forward end a welded, integral, or otherwise rigidly connected, upwardly offset actuating arm or lever arm 50 which, as illustrated, extends at right angles from the axis of the beam 38 and is disposed vertically when the respective beam 38 and its plow bottom 40 are in plowing position. The upper end of each upstanding lever arm 50 is provided with lock means in the form of a swinging latch 52 carried on a transverse pivot pin 53 mounted in bifurcations on the upper end of the arm 50. Each latch 52 is provided on its upper side and at its forward end with an upwardly directed shoulder 54, the rearward end of each latch 52 being provided with a rearwardly disposed downwardly directed latch finger 55 adapted to overhang, engage and lock behind a transverse, latch retaining or lock bar 56 which is welded to the side members 35 of the frame A and constitutes a latch means engageable by the latches 52. Such position is assumed when the respective plow bottom 40 and its beam 38 are in the plowing position as illustrated by the lowered plow bottom 40. Thus, the respective latch finger 55 working through the respective upstanding lever arm 50 serves to lock the operating plow bottom 40 in its operative position, the lock bar 56 serving to maintain this relationship with respect to the frame A. The cross bar 56 also serves as stop means for the lever arms 50 to limit downward movement of the plow bottoms 40 while plowing or ditching. The heels 52a of the latches 52 engage underlying walls between the bifurcated portions of the upper ends of the arms 50, whereby to limit forward swinging movement of the latches when releasing their fingers 55 from the lock bars 56.

For the purpose of raising and lowering the two plow bottoms 40, a single swinging control arm 60 is employed in conjunction with a pull link 62, these constituting the linkage C. The arm 60 normally upstands in the middle of the frame A between the vertical positions of the lever arms 50 and is positioned therein through the medium of a hub 64 on its lower end, this hub being transversely apertured and receiving the transverse shaft 23 carried in the lower end of the frame A. The pull link 62 is pivotally attached at its rearward end to ears 65 provided on the forward face of the arm 60 at an intermediate position, and the forward end of the link 62 is attached by a pivot pin 66 to a bracket 68 secured to a lower portion of the rear housing 22 of the tractor T at a level considerably below the level of the ears 65, whereby to cause a forward swinging of the arm 60 when the frame A is lifted, as indicated in broken lines of Fig. 1. The upper end of the swinging arm 60 carries a pivoted rocking control dog 70 which serves both as an actuating catch and as a trip for the latches 52. This control dog 70 is mounted at its center by a pivot bolt 71 to swing in a generally vertical plane with its ends projecting laterally from the sides of the control arm 60 so that such ends may serve as catch means and be rocked to move selectively to and from the paths of the upper ends of the upstanding lever arms 50 which are rigidly secured to the forward ends of the respective plow beams 38.

The rocking of the dog 70 about its pivot bolt 71 is effected through the medium of two vertically movable push rods 72 and 72a, or the like, slidable as in guides 73 fixed on the opposite sides of the arm 60 and respectively movable upward by means of cam elevations 75 and 75a of cams 76 carried on the opposing end walls of the eyes 38a of the plow beams 38. The cam elevations 75 and 75a thus shift as the beams 38 are raised or lowered, and they are caused to function as the control arm 60 swings between its upright position, as seen in Fig. 3, and a forwardly inclined position, as seen in Fig. 4.

When one end of the rocking dog 70 is positioned in the path of the upper end of one of the actuating lever arms 50 so that it will actuate the latter when drawn forward by the pull link 62 under influence of the lifting of the A-frame A by the power lift L, such end of the dog 70 first moves into contact with the upstanding shoulder 54 on the respective pivoted latch 52. Such engagement of the indicated end of the dog 70 with the shoulder 54 first operates to trip and swing the respective latch 52 about its pivot pin 53 whereby to lift the depending latch finger 55 on the rearward end thereof from its latching position behind its transverse lock bar 56 mounted on the frame A. The respective latch finger 55 having been lifted through forward movement of its shoulder 54, further swinging movement of the respective latch 52 ceases by reason of engagement of the end of the dog 70 with the edge of the respective actuating lever arm 50, or by reason of engagement of the heel 52a of the latch 52 with the bottom of the slot between the bifurcated portions of such lever arm 50, whereupon continued motion of the pull link 62 causes the dog 70 to pull the respective actuating lever arm 50 forward and downward and thereby lift the respective plow beam 38 and its plow bottom 40 with respect to the frame A. The other plow beam 38 and plow bottom 40 descend under control of the counterbalancing cable 41. As such other plow bottom and its beam descend, the respective arm 50 rises and its latch 52 passes under the elevated end of the dog 70 as the latter is pulled down with the control arm 60 to move the other arm 50 and the rising plow bottom 40. When the frame A is lowered by actuation of the power lift L, the swinging arm 60 is returned to its starting position by the link 62, thus bringing the elevated end of the dog 70 into position above and behind the shoulder 54 of the latch 52 of the lowered plow beam which is being retained in lowered position by such latch and its latch finger 55.

As best indicated in Fig. 3, the cam elevation 75a on the elevated beam 38 initially retains the push rod 72a in elevated position so that the respective end of the dog 70 is elevated, the dog 70 being thus rocked about its pivot bolt 71, and the opposite end of the dog 70 is depressed so that it lies behind the upper extremity of the opposite lever arm 50 and behind the shoulder 54 of the respective latch 52, such lever arm 50 being in its upstanding position and the respective plow beam 38 and its plow bottom 40 being in lowered, operative position. Under these conditions, the lower end of the push rod 72 lies forward of the respective cam elevation 75 a distance approximating that represented by the arc through which the cam elevation 75 will swing during the elevation of its plow beam 38. Preferably, the push rods 72 and 72a are frictionally held in their guides 73 so that they will remain in whatever position they are placed by the action of the cam elevations 75 and 75a and the dog 70 as it rocks on its pivot bolt 71.

When the arm 60 is swung forward by the pull link 62, the parts being in the position of Fig. 3, the dog 70, after first actuating the latch 52 on the respective lever arm 50 so as to disengage the latch finger 55 from its lock bar 56 by pressure against the shoulder 54, then operates to swing the mentioned lever arm 50 forward and raise the respective plow beam 38 and its plow bottom 40. Obviously, during this movement the lower end of the push rod 72 maintains its spacing from its cam elevation 75 inasmuch as these parts are moving together. Upon commencement of such forward movement of the swinging arm 60 the lower end of the push rod 72a on the other side of the arm 60 promptly leaves its cam elevation 75a and moves forward thereof, this action being enhanced by the fact that the cam elevation 75a and its plow beam 38 are simultaneously moving in the opposite direction from the movement of the swinging arm 60 and the cam elevation 75. Frictional engagement of the parts is such that engagement with the respective latch 52 of the respective end of the dog 70 (overlying the push rod 72) will be assured during the operation of the parts to raise the one plow bottom through the actuation of the linkage C, as previously described, while the other plow bottom is descending.

The elevation of the one plow bottom and the lowering of the other having been completed, and the location of the cam elevations 75 and 75a having been reversed with respect to each other, when the A-frame A is lowered, the pull link 62 causes the arm 60, together with its dog 70, to be returned to the starting position illustrated in Fig. 3. At the extreme limit of the return movement of the arm 60, the lower end of the push rod 72 comes into contact with the then upstanding cam elevation 75, thereby elevating the push rod 72 and rocking the dog 70 so that its opposite end depressed the push rod 72a into lowered position forward of its cam elevation 75a which now is in its rearward position, the respective plow beam 38 being now in its lowered position. This rocking of the dog 70 causes such opposite end to be forced downward behind the shoulder 54 of the latch 52 on the upper end of that lever arm 50 carried by the now lowered plow beam 38 which also carries the cam elevation 75a. The parts are all now in exactly the opposite position from that illustrated in Fig. 3, and are ready for repetition of the above described movement to reverse the position of the plow bottoms again.

*Operation*

In general, the operation has been outlined in connection with the description of the construction. To recapitulate, the two plow bottoms 40 and their plow beams 38 constituting the plow unit P are raised and lowered about their pivotal mountings on the shaft 23 at the lower end of the A-frame A through actuation of the control linkage C. In each instance, this movement is accomplished through the medium of the power lift L which is under control of the tractor driver and is set into operation by shifting a lever (not shown) which causes functioning of a hydraulic lift means located within the tractor housing 22 as hereinbefore indicated. Such operation of the power lift, which is moderately slow, causes gradual elevation of the outer ends of the crank arms 25 and consequent actuation of the lifting arms 20 and the A-frame A through the medium of the pull rods 24. This is done when the tractor driver reaches the end of a furrow being plowed, the driver turning the tractor around while the lifting operation is being completed to reverse the position of the plow bottoms 40 through the medium of the counterbalancing cable 41. The driver then releases the power lift L to lower the A-frame A so that the lowered plow bottom 40 may sink into the soil. Thus, the next excursion across the field results in turning the respective furrow in the same direction as the previous furrow. The single pull link 62 and swinging control arm 60 actuate both of the plow bottoms 40, the rocking dog 70 serving selectively to actuate the lever arms or actuating arms 50 by selectively engaging the shoulders 54 of the respective latches 52. One end of the control dog 70, being engaged behind a shoulder 54, first acts as a trip and withdraws the latch finger 55 of the respective latch 52 from its lock bar 56 as the power lift L elevates the A-frame A and thereby causes the pull link 62 to pull and move forward the swinging control arm 60. Continued movement then swings the respective actuating lever arm 50 and its plow beam 38 as illustrated by broken lines in Fig. 1. The selective movement of the dog 70 to bring its opposite ends selectively into position with respect to the respective latches 52 is automatically accomplished by the action of the cam elevations 75 and 75a of the respective plow beams 38 upon the push rods 72 and 72a, as previously described.

From the foregoing, it will be apparent that means is provided for automatically shifting the respective plow bottoms 40 through the medium of the power lift L on the tractor, as required by the driver of the tractor.

Since variations of the generic invention herein disclosed will, no doubt, occur to those skilled in this art, it is intended that the claims shall cover all those modifications falling within their scope.

I claim as my invention:

1. In a two-way plow: plow beams respectively carrying oppositely pitched plow bottoms adapted to be simultaneously raised and lowered respectively; a frame upon which said beams are swingingly mounted for vertical movement of said plow bottoms; means for supporting said frame and plow bottoms upon a tractor for automatic raising and lowering of the frame and plow bottoms as a unit by a power lift on the tractor; arms respectively connected with said beams and their plow bottoms for swinging the latter on said frame; bracket means to be mounted on the tractor; link means mounted upon said bracket means; means for operatively and alternately connecting said link means with said arms for alternate swinging of said plow bottoms when said frame is raised; and shiftable means included in said connecting means for alternate engagement with said arms to connect said link means thereto to cause said arms to swing said plow bottoms through raising of said frame.

2. A plow as in claim 1 including actuating means operable by said plow beams as they swing to move said shiftable means.

3. A plow as in claim 1 including latch means associated with said arms for maintaining the operative position of said arms, beams and plow bottoms with respect to said frame.

4. In combination in a two-way plow: plow beams carrying oppositely pitched plow bottoms adapted to be raised and lowered; a frame upon which said beams are pivotally mounted; means for supporting said frame upon a tractor for automatic raising and lowering of the frame and plow bottoms by a power lift on the tractor; separate lifting means connected with said beams for lifting the respective plow bottoms; shiftable actuating means operable for respectively and releasably engaging and moving said lifting means for said bottoms, said actuating means including a swinging arm positioned between said means for lifting said plow bottoms; a movable dog mounted on said swinging arm for alternately engaging said lifting means; shifting means carried adjacent said actuating means to shift said dog for said releasable engagement; means interconnecting said plow bottoms to insure that one plow bottom descends as the other is raised; and means connected with said actuating means and adapted to be connected with the tractor to move said actuating means when said frame is raised or lowered.

5. A combination as in claim 4 including latch means carried by each lifting means and engaging said frame for maintaining the operative position of its associated beam and plow bottom.

6. In combination in a two-way plow: an upstanding frame having a transverse supporting member; means for supporting said frame upon a tractor having a power lift for automatically raising or lowering said frame; plow beams carrying oppositely pitched plow bottoms one of which is adapted to be raised as the other is lowered, said plow beams being mounted on said transverse member to swing vertically as they are raised and lowered; normally upstanding actuating arms carried by said plow beams for swinging said beams; a swinging member disposed upon said transverse member between said plow beams and adapted to upstand normally between the positions of the actuating arms of said plow beams; movable means carried on the upper end of said swinging member and adapted to engage alternately the actuating arms of said plow beams; link means for connecting an upper portion of said swinging member with a lower portion of said tractor to swing said swinging member when said frame is raised; and operating means connected with said plow beams to move said movable means as said plow beams and plow bottoms are raised and lowered with respect to said transverse member.

7. A combination as in claim 6 wherein said movable means is a rocking member and said swinging member is a swinging arm provided at opposite sides with reciprocating means engageable by said operating means, said reciprocating means being arranged to engage spaced portions of said rocking member to rock the latter to engage one or the other of said upstanding actuating arms.

8. A plowing device comprising in combination: a support adapted for connection to an elevationally movable draft connection of a draft vehicle; plowing units pivotally mounted on the support for reciprocal movements in substantially vertical planes and rearwardly positionable from the support for earth engagement; a control arm mounted on the support intermediate the plowing units for reciprocal pivotal movement in a plane substantially parallel to the planes of movement of said plowing units; a catch borne by the control arm and engaged alternately to each of said plowing units on consecutive reciprocal pivotal movements of the control arm; and operating means connected to the control arm and having a portion to connect to a portion of the draft vehicle independent of its elevationally movable draft connection so that raising and lowering of the draft connection reciprocates the control arm and alternately moves the plowing units from operational position.

9. A two-way plow comprising: a support frame adapted for mounting on an elevationally movable draft connection of a draft vehicle; a pair of right and left hand plowing units having forward end portions pivotally borne on the support frame; means interconnecting the plowing units and oppositely positioning the same in alternate operative and inoperative attitudes; latch means mounted on the plowing units and engageable with the support frame for locking the plowing units in operative position; a control arm pivotally mounted on the support intermediate the plowing units; operating means to connect the control arm and the draft vehicle at a point thereof independent of the draft connection and translating elevational movements of the draft connection into reciprocal pivotal movement of the control arm; and a catch borne by the control arm and adapted to be alternately engaged with the latch means of the plowing units so that during reciprocal elevational movements of the draft connection the plowing units are alternately moved to inoperative attitudes.

10. A plow structure comprising: a frame adapted to be mounted upon a vertically movable draft connection of a draft vehicle; a plowing unit having a forward end portion movably mounted on said frame; latch means mounted on the plowing unit and engageable with said frame for locking the plowing unit in operative position, and disengageable from said frame to release said unit; a control arm carried by said plow structure and pivotally mounted with respect to said plowing unit and said frame; operating means to interconnect said control arm and said draft vehicle at a point on said draft vehicle independent of the draft connection for translating vertical movements of the draft connection into reciprocal pivotal movement of the control arm; and catch means carried by said control arm and arranged to engage said latch means of said plowing unit and unlatch the latter.

11. In combination in a plow structure: a frame adapted to be held in an upright position; means for supporting said frame in such position by power lift means of a tractor; a plow beam pivoted upon said frame to swing in a vertical plane; a plow bottom carried by said beam for raising and lowering therewith; an arm pivoted on said plow structure and connected to said beam and plow bottom to raise the same upon pivotal movement of said arm; lock means carried by said frame; latch means pivotally mounted upon said arm to engage said lock means for retention thereby; actuable means carried by said latch means; and actuating pull means for connection to said tractor and for engagement with said actuable means to move said latch means to release the same from said lock means and move said pivoted arm to raise said plow beam and its plow bottom.

12. A tillage device comprising in combination: a support adapted to be carried upon an elevationally movable draft connection of a vehicle having a power lift to impart vertical movements to said support; earthworking means movably mounted on said support and adapted to be raised and lowered therewith by said power lift, said earthworking means being movable from one position to another with respect to said support; actuating means having a lower portion pivoted on a lower portion of said support for to-and-fro movement of an upper portion of said actuating means with respect to an upper portion of said support, said actuating means including means connected to said earthworking means to move the latter between said positions; link means having operative connection with said actuating means and having means for attachment to said vehicle at a point apart from said power lift so that the upper portion of said actuating means is moved thereby upon elevation of said support by said power lift; movable latch means on said actuating means to engage said upper portion of said support and hold said earthworking means against movement on said support; said operative connection including trip means to engage said latch means to release the same upon elevation of said support.

13. A combination as in claim 12 wherein said latch means is provided with shoulder means engageable by said trip means for release of said latch means.

14. An earthworking structure comprising in combination: a support for mounting upon an elevationally movable draft connection of a draft vehicle having a power lift to impart bodily vertical movements to said support; earthworking means pivotally mounted on said support and elevationally movable therewith, said earthworking means being shiftable from one position to another with respect to said support; engageable means carried by said earthworking means for movement with the latter between said positions; control means having a portion so mounted on said structure as to provide for movement of another portion thereof relative to said structure; catch means connected to said other portion of said control means and arranged to engage said engageable means for shifting said earthworking means; and connecting means having one end portion connected to said control means and having another end portion provided with means to be attached to a portion of said vehicle so that upon elevation of said support, said connecting means moves said control means upon its mounting on said structure and causes said catch means to engage said engageable means and shift said earthworking means.

15. In combination in a two-way plow: plow beams carrying oppositely pitched plow bottoms adapted to be raised and lowered; a frame upon which said beams are pivotally mounted; means for supporting said frame upon a tractor for automatic raising and lowering of the frame and plow bottoms by a power lift on the tractor; separate lifting means connected with said beams for lifting the respective plow bottoms; shiftable actuating means movable for alternately engaging and moving said lifting means for said bottoms; shifting means carried adjacent said shiftable actuating means to shift said actuating means for said alternate engagement; means connected with said shiftable actuating means and arranged to be connected to said tractor to move said actuating means when said frame is raised; pivoted latch means upon the separate lifting means for each beam and arranged to engage said frame and maintain such beam in operative position, each latch means having shoulder means; and catch means on said shiftable actuating means to engage said shoulder means and to release said latch means from beam-maintaining position preparatory to lifting the respective beam and plow bottom.

16. In combination in a two-way plow structure: plow beams carrying opposing plow bottoms adapted to be raised and lowered; a frame upon which said beams are pivotally mounted; means for supporting said frame upon a tractor for automatic raising and lowering of the frame and plow bottoms by a power lift on the tractor; lifting means for lifting the respective plow bottoms including a separate lifting means for each plow bottom; latch means mounted upon each lifting means and engageable with said frame for maintaining the operative position of the respective plow bottoms; shoulder means carried by the latch means; a swinging arm on said plow structure; said swinging arm carrying shoulder engaging means; means to move the swinging arm between latch shoulder engaging and disengaging positions; and means for connecting said swinging arm with said tractor to swing said arm as said frame is raised by said power lift.

WILLIAM FISK MELLEN.

REFERENCES CITED

The following references are of record in the file of this patent:

UNITED STATES PATENTS

| Number | Name | Date |
|---|---|---|
| 471,111 | Fields | Mar. 22, 1892 |
| 520,281 | Willard | May 22, 1894 |
| 2,227,366 | Pridgen | Dec. 31, 1940 |
| 2,247,534 | Von Schlegell | July 1, 1941 |
| 2,352,466 | Arps | June 27, 1944 |
| 2,358,964 | Noffsinger | Sept. 26, 1944 |
| 2,401,837 | Mellen et al. | June 11, 1946 |
| 2,437,879 | Ferguson | Mar. 16, 1948 |
| 2,457,163 | Lansing | Dec. 28, 1948 |
| 2,474,731 | Evans | June 28, 1949 |

FOREIGN PATENTS

| Number | Country | Date |
|---|---|---|
| 638,191 | France | Feb. 14, 1928 |
| 544,041 | Great Britain | Mar. 25, 1942 |
| 84,388 | Switzerland | Mar. 1, 1920 |